July 26, 1932.  C. F. HOFMANN  1,868,574
RING FOR SPINNING AND DOUBLING MACHINES
Filed Dec. 26, 1930
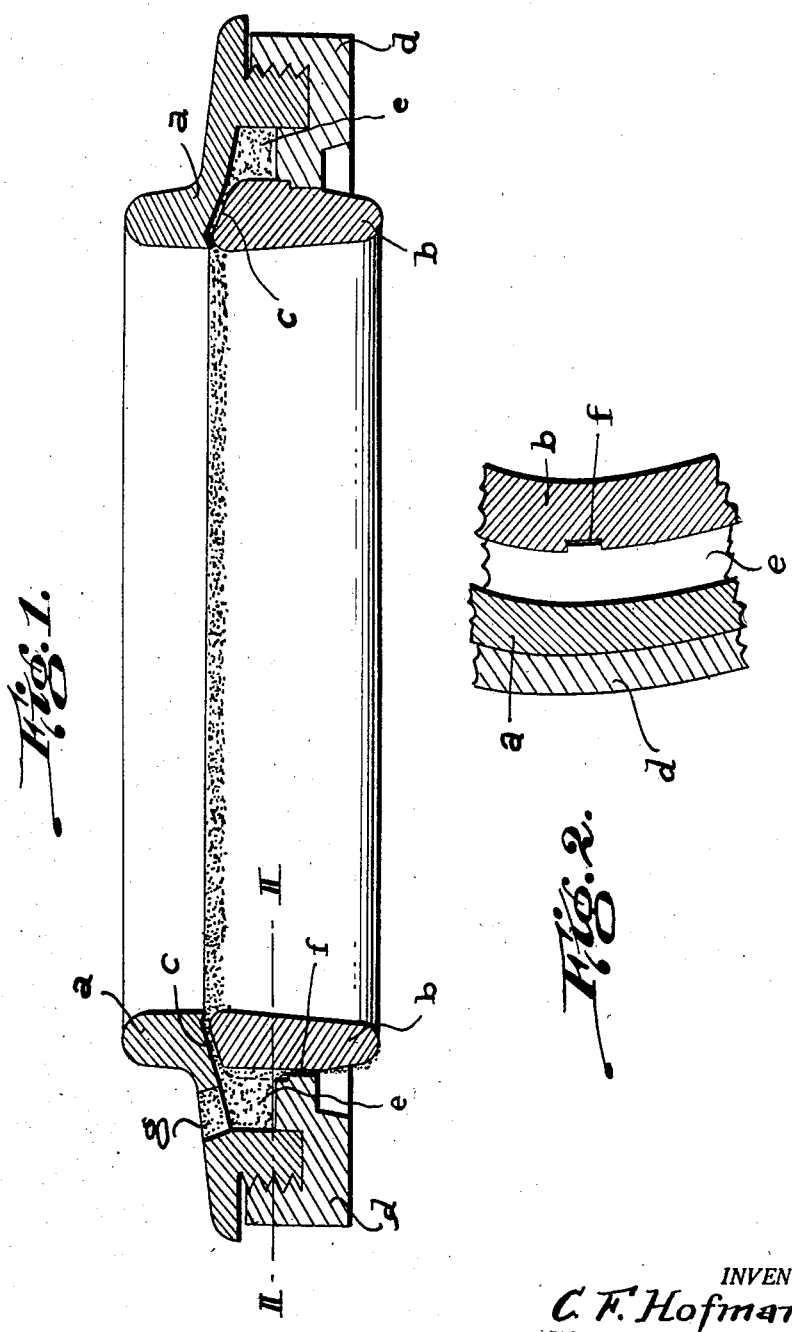
INVENTOR.
C. F. Hofmann
BY Marks + Clerk
ATTORNEYS.

Patented July 26, 1932

1,868,574

UNITED STATES PATENT OFFICE

CARL FRITZ HOFMANN, OF SCHONAU, NEAR CHEMNITZ, GERMANY

RING FOR SPINNING AND DOUBLING MACHINES

Application filed December 26, 1930, Serial No. 504,873, and in Germany January 28, 1930.

Rings for spinning and doubling machines have hitherto been lubricated, as is known, by fat being applied to the interior of the ring, by an operator with the finger. Such a method of lubricating the rings brings with it the disadvantage that the fat can only be applied before the commencement of a doffing or drawing off, since the machine cannot be stopped during the doffing. At the beginning of the work, therefore, there is mostly too much fat on the rings, whereas towards the end there is too little. Furthermore, the fat is frequently rather lacking in uniformity and is too thickly applied, so that the traveller has to distribute it during the work, and under some circumstances has to throw it partly out.

It has also already been proposed to provide the spinning or doubling rings on their internal surfaces with recesses, annular grooves for example, and to employ these annular grooves for the reception of a plastic fat. The fat is intended to become liquid upon the rings being warmed by the revolving travellers, and then to flow down through gaps in the rings on to the frictional surfaces of the rings that are to be lubricated. This method of lubricating the rings has not hitherto been introduced, which is a sign of the fact that it has not proved satisfactory. There is also involved in it the disadvantage that the rings cannot be relubricated by an operator while in operation if the automatic lubrication fails.

By the present invention a ring is provided for spinning and doubling machines, the frictional surfaces of which can be lubricated even while they are in operation. This is rendered possible according to the invention owing to the fact that on the ring one or more closed storage spaces or ducts for the lubricant are provided, out of which the lubricant can be positively conveyed to the frictional surfaces, through the ring for example, or along the outside, by the pressure of a fat or oil spray, Stauffer lubricator or the like.

The invention is illustrated by way of example in the accompanying drawing, in which Figure 1 shows a section through a ring according to the invention, Figure 2 a partial section on the line II—II and through the ring shown in Figure 1, The ring according to the invention is so constructed that its frictional surfaces can be lubricated even while in operation. This can be attained by the most varied means. Particularly advantageous constructions are illustrated in the drawing.

According to Figures 1 and 2, the ring, otherwise consisting of one piece, is subdivided into two ring parts $a$ and $b$. These ring parts are spaced some distance apart, so that between them there is an annular joint $c$. The ring members are held in this position by an external ring $d$. In the case of the present constructional example the ring member $b$ is forced into the outer ring, while the ring member $a$ is screwed into the latter. The said members are in this case so shaped that they form together a closed annular space $e$. This annular space communicates with the annular joint $c$, and is adapted to receive a lubricant, from a Stauffer lubricator, an oil spray or an oil duct for example, and to distribute it into the annular joint $c$, out of which it then passes on to the frictional surface on the inside of the ring. Here the lubricant is then taken up by the ring traveller, a separate distribution by the latter not being required, since the annular joint extends round the entire periphery of the ring.

From the annular space $e$ there may furthermore start one or more slots $f$, by which the lubricant passes along the outside of the lower ring member into the region of the lower hook of the traveller, from which it is then caught and distributed upon the lower race. By $g$ is denoted a coupling aperture for the Stauffer lubricator, oil spray or oil pipe.

Reference may also be made to the fact that a plurality of rings according to the invention may of course be connected to a central oil or lubricating pipe, so that it is possible to lubricate a number of rings, for instance to lubricate all the rings of a ring rail, at the same time.

What I claim is:—

1. A ring for spinning and doubling machines comprising in combination a plurality of ring parts forming a space for the reception of a lubricant and abutting with the formation of a slot between two ring parts at the place of contact of the internal surface of the ring by the traveler in its working position, the slot leading the lubricant to the place of contact of the internal surface by the traveler, extending over the periphery of the ring and communicating with the space for the reception of the lubricant.

2. A ring for spinning and doubling machines comprising in combination an upper ring part, a lower ring part and a third ring for holding together the upper ring part and the lower ring part, the ring parts forming together with the third ring a space for the reception of a lubricant and the upper and lower ring parts abutting with the formation of a slot at the place of contact of the internal surface of the ring by the traveler in its working position, the slot leading the lubricant to the place of contact of the internal surface by the traveler, extending over the entire periphery of the ring and communicating with the space for the reception of the lubricant.

3. A ring for spinning and doubling machines comprising in combination an upper ring part, a lower ring part and a third ring for holding together the upper ring part and the lower ring part, the ring parts forming together with the third ring a space for the reception of a lubricant and the upper and lower ring parts abutting with the formation of a slot at the place of contact of the internal surface of the ring by the traveler in its working position, the slot leading the lubricant to the place of contact of the internal surface by the traveler, extending over the entire periphery of the ring and communicating with the space for the reception of the lubricant while the third ring contains slot-like bores extending from the lubricant space downward and leading the lubricant to the lower external peripheral surface of the ring.

In testimony whereof I have signed my name to this specification.

CARL FRITZ HOFMANN.